United States Patent [19]
Zimmerman et al.

[11] Patent Number: 5,598,281
[45] Date of Patent: *Jan. 28, 1997

[54] BACKLIGHT ASSEMBLY FOR IMPROVED ILLUMINATION EMPLOYING TAPERED OPTICAL ELEMENTS

[75] Inventors: Scott M. Zimmerman, Basking Ridge; Karl W. Beeson, Princeton; Paul M. Ferm, Morristown, all of N.J.

[73] Assignee: AlliedSignal Inc., Morris Township, N.J.

[ * ] Notice: The term of this patent shall not extend beyond the expiration date of Pat. No. 5,396,350.

[21] Appl. No.: 203,232

[22] Filed: Nov. 19, 1993

[51] Int. Cl.$^6$ .................................................. G02F 1/1335
[52] U.S. Cl. .................................................. 349/5; 349/68
[58] Field of Search .................................. 359/42, 48, 49, 359/40, 41

[56] References Cited

U.S. PATENT DOCUMENTS

| | | | |
|---|---|---|---|
| 3,863,246 | 1/1975 | Trcka et al. | 340/324 |
| 3,923,381 | 12/1975 | Winston | 350/293 |
| 4,003,638 | 1/1977 | Winston | 350/293 |
| 4,043,636 | 8/1977 | Eberhardt et al. | 350/160 |
| 4,240,692 | 12/1980 | Winston | 350/96.1 |
| 4,330,813 | 5/1992 | Deutsch | 362/244 |
| 4,365,869 | 12/1982 | Hareng et al. | 350/345 |
| 4,686,519 | 8/1987 | Yoshida et al. | 340/701 |
| 4,726,662 | 2/1988 | Cromack | 350/345 |
| 4,798,448 | 1/1989 | van Raalte | 359/49 |
| 4,799,137 | 1/1994 | Aho | 362/309 |
| 4,874,227 | 10/1989 | Matsukawa et al. | 359/42 |
| 4,874,228 | 10/1989 | Aho et al. | 350/345 |
| 5,050,946 | 9/1991 | Hathaway et al. | 385/33 |
| 5,083,854 | 1/1992 | Zampolin et al. | 359/48 |
| 5,099,343 | 3/1992 | Margerum et al. | 359/48 |
| 5,126,882 | 6/1992 | Oe et al. | 359/619 |
| 5,128,783 | 7/1992 | Abileah et al. | 359/49 |
| 5,128,787 | 7/1992 | Blonder | 359/70 |
| 5,151,801 | 9/1992 | Hiroshima | 359/40 |
| 5,161,041 | 11/1992 | Abileah et al. | 359/40 |
| 5,182,663 | 1/1993 | Jones | 359/70 |
| 5,202,950 | 4/1993 | Arego et al. | 385/146 |
| 5,206,746 | 4/1993 | Ooi et al. | 359/40 |
| 5,237,641 | 8/1993 | Jacobson et al. | 385/146 |
| 5,253,089 | 10/1993 | Imai | 359/49 |
| 5,253,151 | 10/1993 | Mepham et al. | 362/216 |

(List continued on next page.)

FOREIGN PATENT DOCUMENTS

| | | | |
|---|---|---|---|
| 0030875 | 6/1981 | European Pat. Off. | |
| 0500960A1 | 2/1992 | European Pat. Off. | G02B 6/00 |
| 0518362A1 | 12/1992 | European Pat. Off. | |
| 60-227233 | 11/1985 | Japan | |
| 545505 | 2/1993 | Japan | G02B 5/02 |
| 560908 | 3/1993 | Japan | G02B 5/02 |
| 589827 | 4/1993 | Japan | H01J 61/00 |
| WO9400780 | 1/1994 | WIPO | G02B 3/02 |

OTHER PUBLICATIONS

IBM Technical Disclosure Bulletin, vol. 29 No. 11 Apr. 1987.
Patent Abstracts of Japan, vol. 10 No. 93 (P–445) [2150], 10 Apr. 1986.

*Primary Examiner*—William L. Sikes
*Assistant Examiner*—James A. Dudek
*Attorney, Agent, or Firm*—Venge E. Kreger, Jr.

[57] ABSTRACT

An improved backlight assembly comprising an array of apertures in close proximity to a light source, an array of tapered optical elements that have a light input surface area smaller than the light output surface area. Light rays pass through the apertures and are directed to the optical elements which transmit the light rays via internal reflection to provide a partially collimated light source. The light rays then pass through an array of microlenses that transmit the light rays via refraction and provide a substantially more collimated light source for the display elements of a display. The backlight assembly is advantageously used as a backlighting means for electro-optical displays, especially those designed for military and avionics applications.

17 Claims, 15 Drawing Sheets

U.S. PATENT DOCUMENTS

| | | | |
|---|---|---|---|
| 5,262,880 | 11/1993 | Abileah | 359/40 |
| 5,262,928 | 11/1993 | Kashima et al. | 362/31 |
| 5,267,062 | 11/1993 | Bottorf | 359/40 |
| 5,267,063 | 11/1993 | Ray | 359/49 |
| 5,276,538 | 1/1994 | Monji et al. | 359/40 |
| 5,278,545 | 1/1994 | Streck | 345/102 |
| 5,280,371 | 1/1994 | McCartney, Jr. et al. | 359/40 |
| 5,295,048 | 3/1994 | Park et al. | 362/26 |
| 5,303,322 | 4/1994 | Winston et al. | 385/129 |
| 5,396,350 | 3/1995 | Beeson et al. | 359/48 |
| 5,396,406 | 3/1995 | Ketchpel | 362/27 |

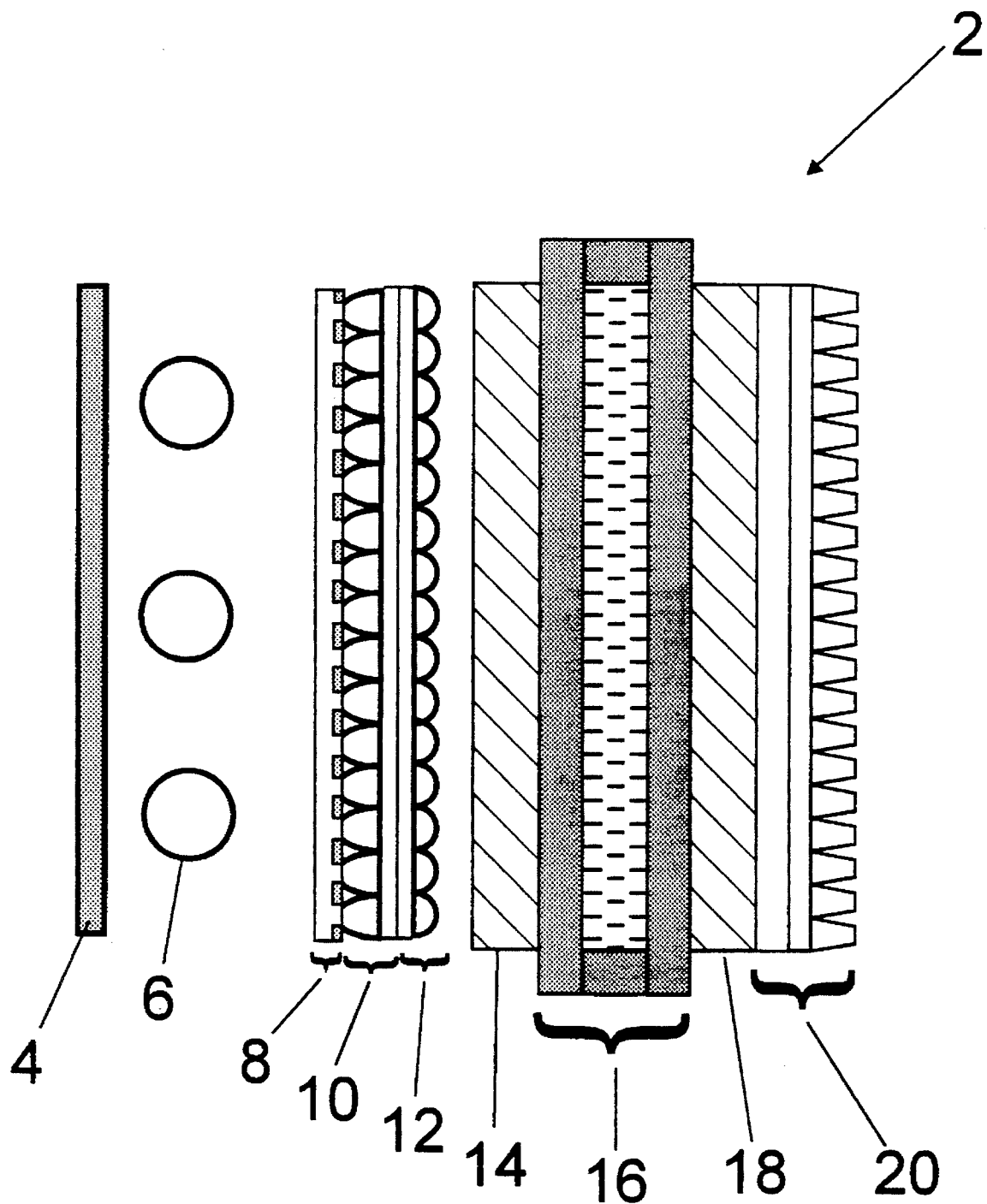

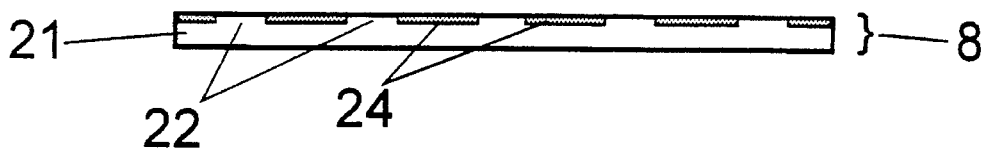
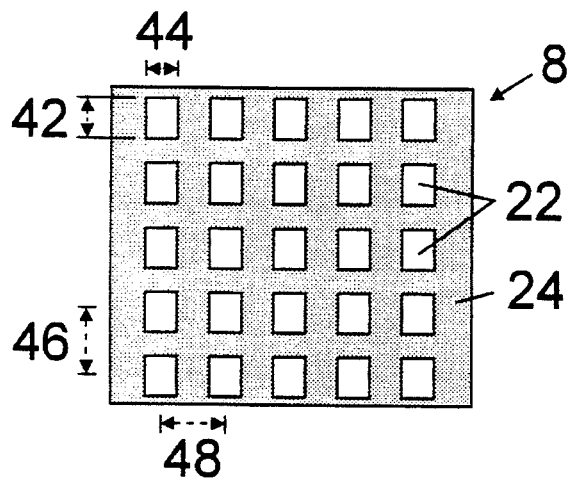
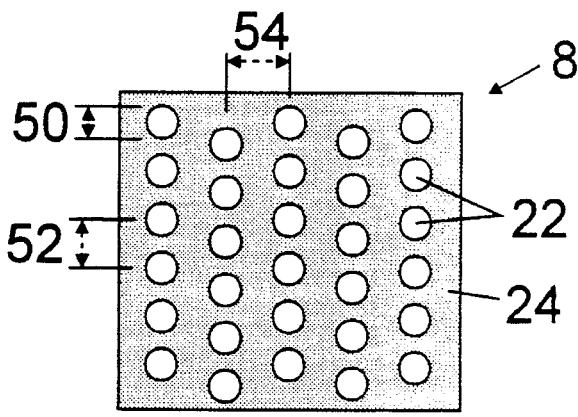
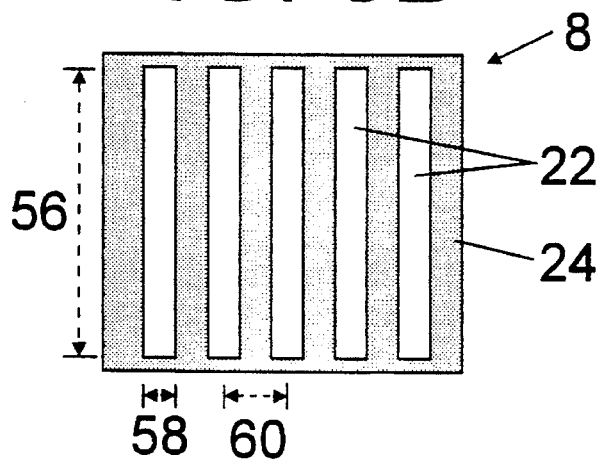

BACKLIGHT ASSEMBLY FOR IMPROVED ILLUMINATION EMPLOYING TAPERED OPTICAL ELEMENTS

BACKGROUND OF THE INVENTION a. Field of the Invention

This invention is directed to direct view electro-optical displays, as for example, a liquid crystal display, and more particularly, relates to the field of backlit displays particularly adapted for military and avionics applications which are specially designed to present a bright, uniform distribution of light in a low profile assembly.

b. Description of Related Art

There has been an extensive ongoing effort to provide large, full color display systems which do not rely upon the conventional cathode ray tube. See, for example, "Flat-Panel Displays," *Scientific American*, March 1993, pages 90–97. In systems such as television receivers, computer monitors, avionics displays, aerospace displays and military-related displays, the elimination of cathode ray tube technology is desirable. See for example U.S. Pat. Nos. 4,843,381, 5128, 783 and 5,161,041 for a discussion of the disadvantages of cathode ray tube technology.

Display devices, as for example, projection display devices, off screen display devices and direct view displays are known. See for example, EPO 0 525 55 A1; U.S. Pat. Nos. 4,659,185, 5,132,830 and 5,159,478; and Japanese Publication Nos. 245106 and 42241. Such displays are used in a wide range of applications including televisions, computer monitors, avionics displays, aerospace displays, automotive instrument panels and other devices that provide text, graphics or video information. These types of displays can replace conventional cathode ray tube displays and offer advantages such as lower profile, reduced weight and lower power consumption.

One display which can eliminate the shortcomings of a cathode ray tube is the flat panel liquid crystal display (LCD). LCDs are typically either reflective or transmissive. A reflective display is one which depends upon ambient light conditions in order to view the display. A transmissive LCD requires an illuminating means or backlight to ensure that the display image is as bright as possible. LCDs, however, suffer from a number of inherent disadvantages. For example, at high viewing angles (large angles from the direction normal to the surface of the display), LCDs exhibit low contrast and changes in visual chromaticity as the viewing angle changes.

The characteristics of the backlighting scheme are very important to both the quality of the image displayed by the matrix array of picture elements of the LCD and the profile of the display. See U.S. Pat. Nos. 5,128,783 and 5,161,041 for a discussion of the deficiencies in past backlighting configurations.

Accordingly, there exists a need in the flat panel electro-optical display field for an improved lighting/optical arrangement which provides an efficient, bright and uniform image of high contrast and is capable of being viewed over a wide viewing angle, while maintaining a narrow profile.

SUMMARY OF THE INVENTION

The present invention is directed to direct view flat panel displays, having an improved backlit electronic display which provides an efficient, bright, uniform image with high contrast and is capable of being viewed over a wide viewing angle. An example of a flat panel display is a liquid crystal display which is referred hereinafter only to demonstrate a specific application of the present invention and is not intended to limit the invention to the precise form disclosed.

The improved backlit liquid crystal display comprises: a modulating means that is capable of projecting an image to a remotely positioned observer, the modulating means spacedly disposed from an improved backlight assembly comprising a light source in close proximity to an aperturing means, wherein the aperturing means comprises an array of apertures operatively disposed in close proximity between the light source and the modulating means; a first means for collimating the divergent light rays emanating from the aperturing means, wherein the first collimating means is disposed in close proximity between the aperturing means and the modulating means; and a second means for collimating the light rays emanating from the first collimating means, wherein the second collimating means is disposed in close proximity between the first collimating means and the modulating means. In an alternate aspect of the invention, the first collimating means incorporates the function of the aperture means. In still another aspect of the invention, the backlight assembly comprises a light concentrating means in combination with a collimating means.

The improvement in the display of the present invention is that the aperturing means and the first and second collimating means provide an energy efficient, bright and uniformly distributed light source that is provided in a low profile assembly.

In one aspect of this invention, the aperture means comprises an array of apertures arranged in a planar reflecting surface. The first collimating means comprises an array of microcollimators. The second collimating means comprises a corresponding array of microlenses. The microcollimators are tapered optical elements on a planar substrate having a planar light input surface in close proximity to the aperturing means and a planar light output surface adjacent to the substrate and distal from and parallel to the light input surface, wherein the light output surface is larger in area than the light input surface. Divergent light rays from a light source pass through the apertures to the light input surface of the microcollimators and travel through the array of microcollimators via total internal reflections from the sides of the microcollimators. The tapered construction partially collimates the light rays so that the output of each microcollimator becomes a source of partially collimated light. The output of the microcollimators is directed to a corresponding array of microlenses disposed adjacent to the microcollimators at the appropriate distance. The light is transmitted through each microlens via refraction and emerges from the array of microlenses as a substantially more collimated light source for the modulating means.

In another aspect of the invention, the functions of the aperturing means and first collimating means are combined into one set of microcollimating elements. The microcollimators are tapered optical elements on a planar substrate having mirrored sidewalls, a planar light input surface in close proximity to the light source, wherein the input surface functions as an aperturing means and a planar light output surface adjacent to the substrate and distal from and parallel to the light input surface, wherein the light output surface is larger in area than the light input surface. Uncollimated light rays from the light source pass through the array of microcollimators via one or more reflections from the mirrored sides of the microcollimators. The tapered construction partially collimates the light rays so that the output of each microcollimator becomes a source of partially collimated light. The output of the microcollimators is directed to a corresponding array of microlenses disposed adjacent to the microcollimators at the appropriate distance. The light is transmitted through each microlens via refraction and emerges from the array of microlenses as a substantially more collimated light source for the modulating means.

In still another aspect of the invention, the aperture means comprises an array of apertures arranged in a planar reflecting surface. The first collimating means comprises a planar slab of transparent material and the second collimating means comprises an array of microlenses. The planar slab of transparent material of the first collimating means causes the light from the aperture means to be directed into a narrower angular distribution than would be the case if the volume between the aperture means and the second collimating means were filled with air. The output of the first collimating means is directed to an array of microlenses spacially alligned to the array of apertures and disposed adjacent to the first collimating means. The light is transmitted through each microlens via refraction and emerges from the array of microlenses as a substantially more collimated light source for the modulating means.

In still yet another aspect of the invention, the backlight assembly comprises a light concentrating means in combination with a collimating means. The light concentrating means is perferably an array of microconcentrators. Microconcentrators are tapered optical elements attached to a planar substrate having a mirrored sidewalls, a planar light input surface adjacent to the substrate and a planar output surface distal from and parallel to the light input surface, wherein the area of the light output surface is smaller than the area of the light input surface. Uncollimated light rays from the light source pass through the array of microconcentrators via one or more reflections from the mirrored sides of the microconcentrators. The tapered construction concentrates the light rays so that the output of each microconcentrator becomes a source of light that is substantially smaller in area than the area of the light input surface of the microconcentrator. The output of the microconcentrators is directed to a corresponding array of microlenses disposed above the microconcentrators at the appropriate distance. The light is transmitted through each microlens via refraction and emerges from the microlenses as a substantially collimated light source for the modulating means.

In each aspect of the invention, the uncollimated light source may consist of a single, elongated, serpentine, tubular lamp defining a given lighting configuration. Alternatively, the uncollimated light source may consist of a plurality of discrete tubular lamps, also defining a given lighting configuration. In addition, the backlight assembly may also comprise a reflective surface, such as a mirror, disposed behind the uncollimated light source to redirect stray light rays into the array of microconcentrators.

The improved backlighting arrangement of the present invention is able to operate with equal effectiveness in passive displays as well as in active matrix electronic displays. Such displays are well known to those skilled in the art Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the claims.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which:

FIG. 1 is a cross-sectional view of a liquid crystal display constructed in accordance with one embodiment of the present invention;

FIG. 3A is a cross-sectional view of one embodiment of the aperturing means of the present invention;

FIGS. 3B–3D are a planar views of possible arrangements of the aperturing means of the present invention;

DETAILED DESCRIPTION OF THE PREFERRED EMBODIMENTS

Figure 2A:
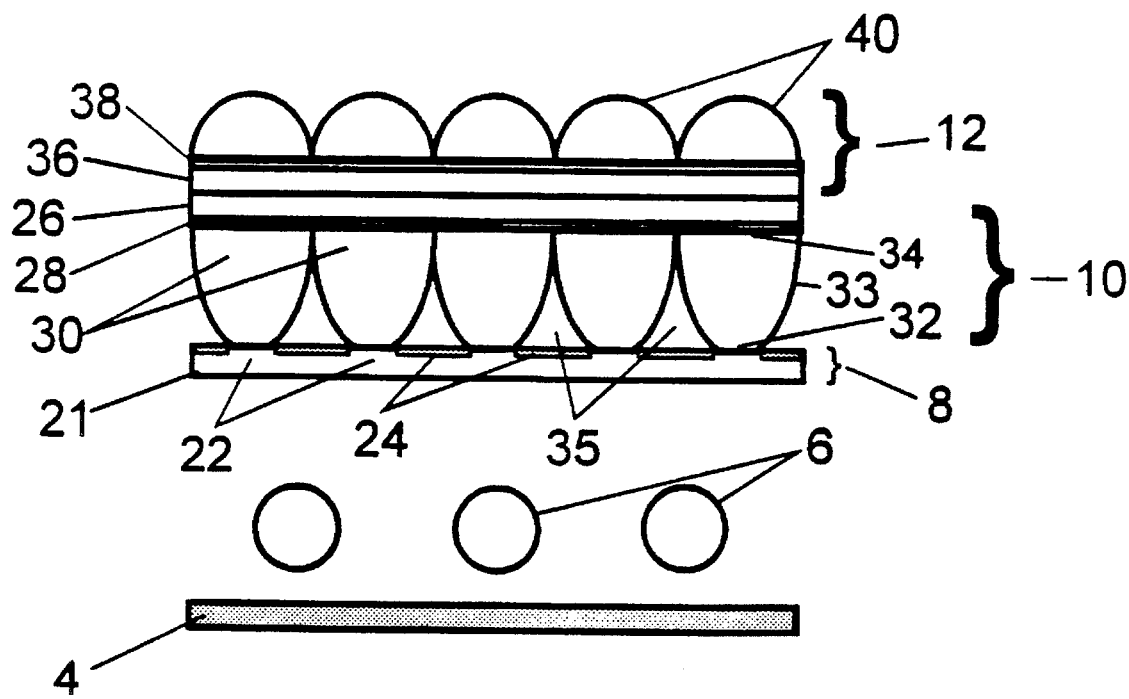
FIG. 2A is an exploded cross-sectional view of one embodiment of the backlight assembly in accordance with the present invention.

The preferred embodiments of the present invention will be better understood by those skilled in the art by reference to the above figures. The preferred embodiments of this invention illustrated in the figures are not intended to be exhaustive or to limit the invention to the precise form disclosed. They are chosen to describe or to best explain the principles of the invention and its applicable and practical use to thereby enable others skilled in the art to best utilize the invention.

One preferred embodiment of the invention as it applies to an application in conjunction with a liquid crystal display is shown in FIG. 1 represented by the number 2. The display is composed of a light generating means 6, an optional reflective means 4, an aperturing means 8, a first collimating means 10, a second collimating means 12, an optional input light polarizing means 14, a modulating means 16, an optional output light polarizing means 18 and an image display means 20.

The exact features of light generating means 6, reflective means 4, input light polarizing means 14, modulating means 16, output light polarizing means 18 and display means 20 are not critical and can vary widely, and any such elements conventionally used in the art of flat-panel displays may be employed in the practice of this invention. Illustrative of useful light generating means 6 include serpentine or discrete tube fluorescent lights. Useful reflective means 4 include metallic reflectors, metal coated glass mirrors, phosphor screens, reflectors coated with white surfaces, such as titanium dioxide layers and the like. Exemplary of useful light polarizing means 14 and 18 are plastic sheet polaroid material and the like. Illustrative modulating means 16 are liquid crystal cells, electrochromic modulators and lead zirconium lanthanum titanate (PZLT) modulators. The liquid crystal material in liquid crystal cells can vary widely and can be one of several types including, but not limited to, twisted nematic (TN) material, super-twisted nematic (STN) material and polymer dispersed liquid crystal (PDLC) material. Such liquid crystal material is arranged in a matrix array of rows and columns as is known in the art. The preferred display means 20 is the display means as disclosed in copending U.S. patent application 08/086,414, filed Jul. 1, 1993 and assigned to the assignee of the present application, the disclosure of which is incorporated herein by reference.

In FIG. 1, light generating means 6 is in close proximity to aperturing means 8, which is in close proximity to first collimating means 10, which is in close proximity to second collimating means 12, and second collimating means 12 is in close proximity to polarizing means 14 which itself is in proximity to modulating means 16. As used herein, "proximity" means in intimate physical contact or closely positioned, preferably within less than about 1 inch, depending upon the element and its function.

FIG. 2A shows an exploded sectional view of the light generating means 6, reflective means 4, aperturing means 8, the first collimating means 10 and the second collimating means 12. Aperturing means 8 comprises a substrate 21 with reflective regions 24 and transparent aperture regions 22. First collimating means 10 comprises an array of microcollimators 30. The microcollimators 30 are tapered optical elements attached to a planar substrate 26 via an adhesion promoting layer 28. Microcollimator 30 comprises a planar light input surface 32 adjacent to a transparent aperture 22 of aperturing means 8, tapered sides 33 and a planar light output surface 34 larger in surface area than the light input surface 32. Uncollimated light from the light source 6 passes through the apertures 22 of the aperturing means 8 and then through the array of microcollimators 30 via total internal reflections from the sides 33 of the microcollimators. The tapered construction causes the light rays at the output of each microcollimator to become partially collimated. Preferably, the backlight assembly also comprises a reflecting means 4 that reflects stray light rays through aperature 22.

Second collimating means 12 comprises a corresponding array of microlenses 40 disposed above the microcollimators 30. The array of microlenses 40 is attached to substrate 36 via an adhesion promoting layer 38. The height of substrates 26 and 36 is dimensioned to equal the necessary distance between microcollimator 30 and microcrolens 40 in order to obtain substantially more collimated light. The light output of each microcollimator 30 is directed to a corresponding microlens 40. The light transmits through each microlens via refraction and emerges from the microlenses as a substantially more collimated light source for the modulating means 16.

Planar substrates 21, 26 and 36 are transparent to light within the wavelength range from about 400 to 700 nm. In the preferred method of fabrication, as described below, the substrates 26 and 36 are also transparent to ultraviolet (UV) light in the range from about 250 to about 400 nm. This range allows the microcollimators and microlenses to be formed by photopolymerization of reactive monomers initiated by UV light. The index of refraction of all three substrates are equal or substantially equal and may range from about 1.45 to about 1.65. The most preferred index of refraction is from about 1.50 to about 1.60. Substrates 21, 26 and 36 may be made from any transparent solid material. Preferred materials include transparent polymers, glass and fused silica. Desired characteristics of these materials include mechanical and optical stability at typical operation temperatures of the device. Most preferred materials are glass, acrylic, polycarbonate and polyester. Substrates 26 and 36 also serve as spacers between the microcollimators 30 and microlenses 40. The combined thickness of substrates 26 and 36 is optimized to cause light from microcollimators 30 to be collimated by microlenses 40.

Microcollimator 30 and microlens 40 can be constructed from any transparent solid polymer material. Preferred materials have an index of refraction substantially equal to substrates 21, 26 and 36 of between about 1.45 and about 1.65 and include polymethylmethacrylate, polycarbonate, polyester, polystryrene and polymers formed by photopolymerization of acrylate monomers. More preferred materials have an index of refraction between abut 1.50 and about 1.60 and include polymers formed by photopolymerization of acrylate monomer mixtures composed of urethane acrylates and methacrylates, ester acrylates and methacrylates, epoxy acrylates and methacrylates, (poly) ethylene glycol acrylates and methacrylates and vinyl containing organic monomers. Useful monomers include methly methacrylate, n-butyl acrylate, 2-ethylhexyl acrylate, isodecyl acrylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, trimethylol propane triacrylate, pentaerythritol triacrylate and pentaerythritol tetra-acrylate. Especially useful are mixtures wherein at least one monomer is a multifunctional monomer such as diacrylate or triacrylate, as these will produce a network of crosslinks within the reacted photopolymer. The most preferred materials for use in the method of the invention are crosslinked polymers formed by photopolymerizing mixtures of ethoxylated bisphenol A diacrylate and trimethylol propane triacrylate. The index of refraction of the most preferred materials ranges from about 1.53 to about 1.56.

The index of refraction of interstitial region 35 between the microcollimators 30 must be less than the index of refraction of each microcollimator 30. Preferred materials for interstitial regions include air, with an index of refraction of 1.00 and fluoropolymer materials with an index of refraction ranging from about 1.30 to about 1.40. The most preferred material is air.

The adhesion promoting layers 28 and 38 shown in FIG. 2A are an organic material that is light transmissive and that causes microcollimators 30 and microlenses 40, especially those formed from polymers, as for example photo-crosslinked acrylate monomer materials, to adhere strongly to their respective substrate. Such materials are well known to those skilled in the art. The thickness of adhesion promoting layers 28 and 38 is not critical and can vary widely. In the preferred embodiment of the invention, adhesion layers 28 and 38 are less than about 1 micrometer thick.

Figure 2B:
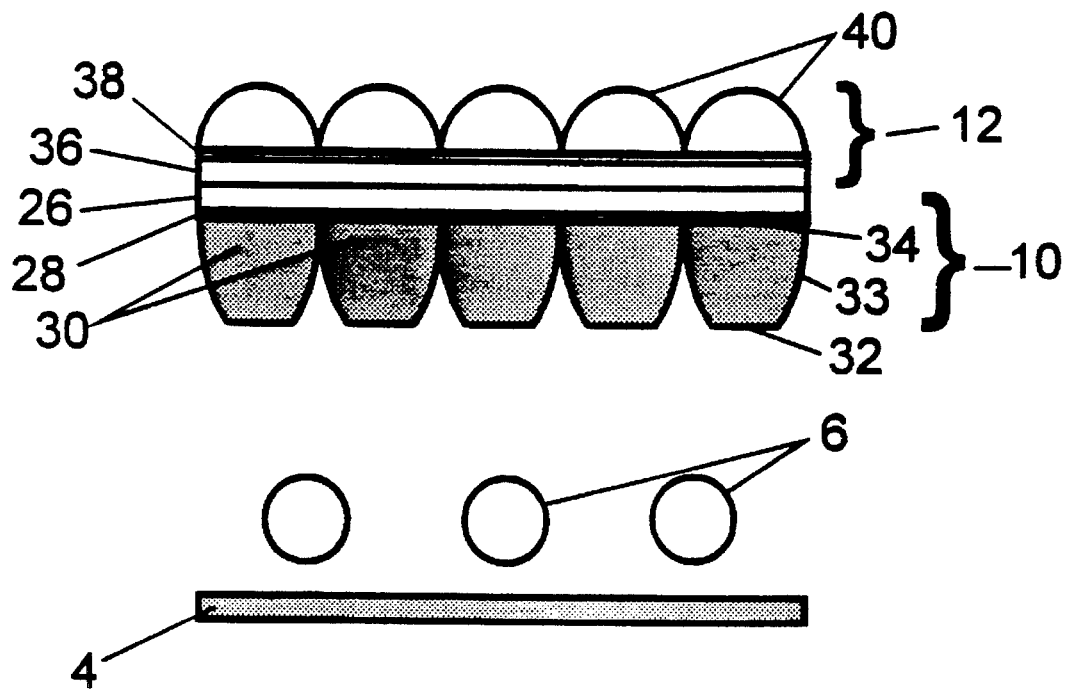
FIG. 2B is an exploded cross-sectional view of an alternate embodiment of the backlight assembly in accordance with the present invention.

FIG. 2B shows another embodiment of the present invention in which the function of the aperturing means 8 shown in FIG. 2A is combined with the first collimating means 10. In FIG. 2B the sides 33 of microcollimators 30 are coated with a reflective layer to form a mirrored surface. The input ends 32 remain transparent to accept the light rays and become the input apertures for the microcollimator array. The coating used on the sides 33 of the microcollimators can be any reflective material such as aluminum, chrome or silver.

FIG. 3A shows a cross-sectional view of the aperturing means 8 comprising substrate 21, reflective regions 24 and transparent aperture regions 22. In this illustration, the aperture regions 22 are arranged in a square or rectangular array, as shown in FIG. 3B, although other arrangements such as a hexagonal pattern are possible, as shown in FIG. 3C. The aperture regions 22 may be any shape such as a rectangle or circle as shown in FIGS. 3B and 3C having length dimension 42, a width dimension 44 or a diameter 50 respectively. It is preferred that the sum of the areas for all light apertures 22 range from about 5 percent to about 50 percent of the total area of substrate 21. It is more preferred that the sum of the areas for all light apertures 22 range from about 10 percent to about 40 percent of the total area of substrate 21. It is most preferred that the sum of the areas for all light apertures 22 range from about 20 percent to about 30 percent of the total area of substrate 21. Dimensions 42, 44 and 50 are adjusted to meet those parameters.

The aperture regions 22 have repeat distances 46 and 48 in FIG. 3B and 52 and 54 in FIG. 3C. The repeat distances 46, 48, 52 and 54 may be equal or unequal and may vary widely depending on the resolution and dimensions of the display. Desired values of the repeat distances range from about 10 microns to about 40 millimeters. More preferred values of the repeat distances range from about 50 microns to about 10 millimeters. Most preferred values of the repeat distances range from about 100 microns to about 2 millimeters. FIG. 3D illustrates another alternative shape of the apertures 22. Each aperture 22 may have a length 56 that substantially corresponds to the length of substrate 21, width dimension 58 and repeat dimension 60. Width 58 and repeat dimension 60 correspond to those stated above for FIGS. 3B and 3C.

Figure 4:
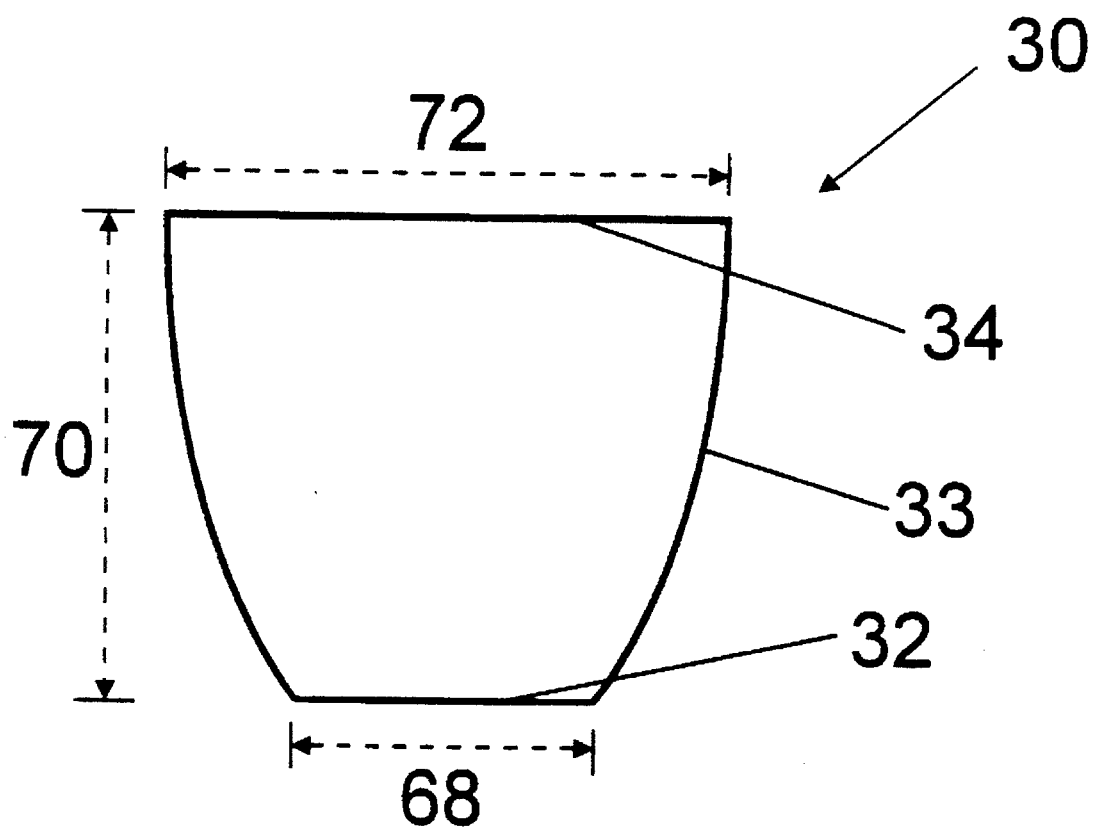
FIG. 4 is a cross-sectional view of a single microcollimator.

A single microcollimator 30 is shown in FIG. 4. A cross-section of the microcollimator 30 in a plane parallel to the input surface 32 and the output surface 34 can be any shape such as a square, rectangle or circle among others. It is preferred that the shape of each of the input surfaces 32 is substantially the same shape as its corresponding aperture 22. Accordingly, it is also preferred that the total area of the light input surfaces 32 is substantially equal to the total area of apertures 22 discussed above.

Light input surface 32 has a width dimension 68 and a length dimension 69 (not shown). Alternatively, dimension 68 may represent diameter 50 if the shape of input surface 32 is circular. It is preferred that width dimension 68 is substantially equal to the corresponding width dimension of aperture 22. It is preferred that length dimension 69 be substantially equal to the corresponding length dimension of aperture 22.

Light output surface 34 has a width dimension 72 and a length dimension 73 (not shown). Alternatively, dimension 72 may represent the diameter of a circle if the shape of output surface 32 is circular. Width 72 may vary widely depending on the dimensions and resolution of the display. That is, smaller displays, such as laptop computer displays and avionics displays would have greatly reduced dimensions versus larger displays, such as large-screen, flat-panel televisions. It is preferred that the sum of the areas for all light output surfaces 34 range from about 40 percent to about 100 percent of the total area of substrate 26. It is more preferred that the sum of the areas for all light output surfaces 34 range from about 55 percent to about 100 percent of the total area of substrate 26. It is most preferred that the sum of the areas for all light output surfaces 34 range from about 70 percent to about 100 percent of the total area of substrate 26. Dimensions 72 and 73 are adjusted to meet those parameters.

The height of microcollimator 30 has dimension 70. Desired values of the dimension 70 range from about 0.3 times width 72 to about 6.0 times width 72. More preferred values of the dimension 70 range from about 0.4 times width 72 to about 4.0 times width 72. Most preferred values of dimension 70 range from about 0.5 times width 72 to about 3.0 times width 72.

Sidewalls 33 connect input surface 32 to output surface 34. Sidewalls 33 can be straight, but preferably, sidewalls curve outwardly as shown in FIG. 4.

Figure 5A:
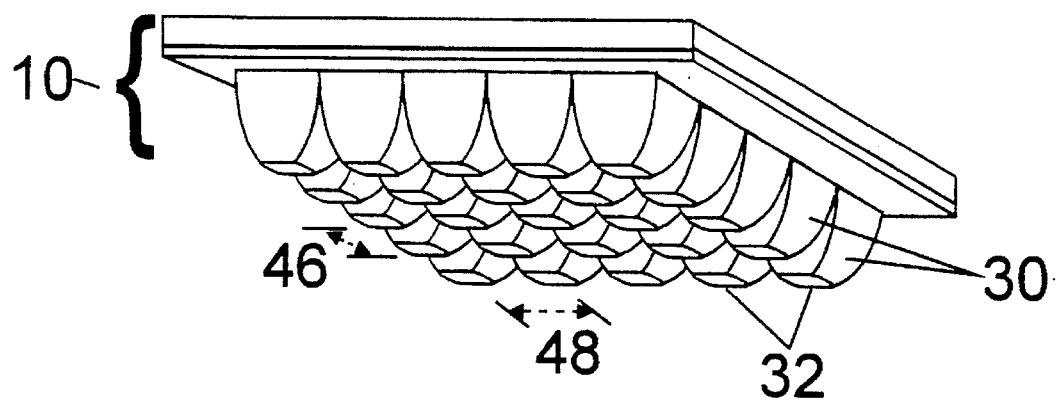
FIGS. 5A–C are persective views of alternate arrangements of the first collimating means comprising an array of microcollimators.
Figure 5B:
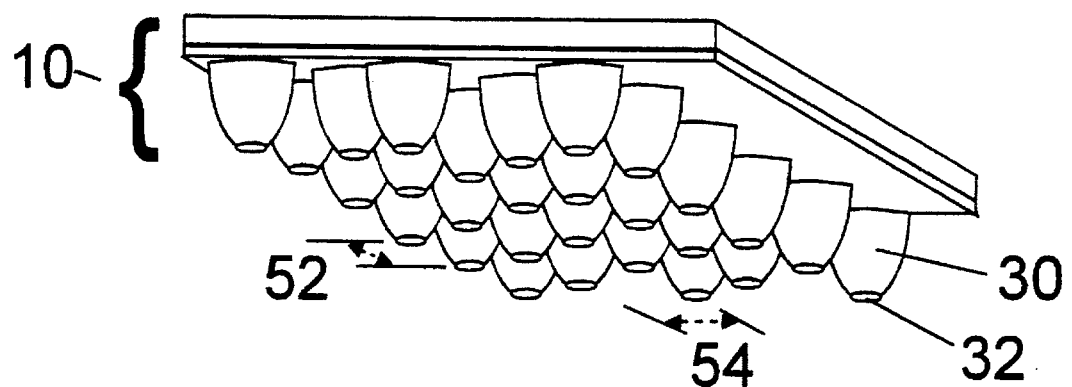
Figure 5C:
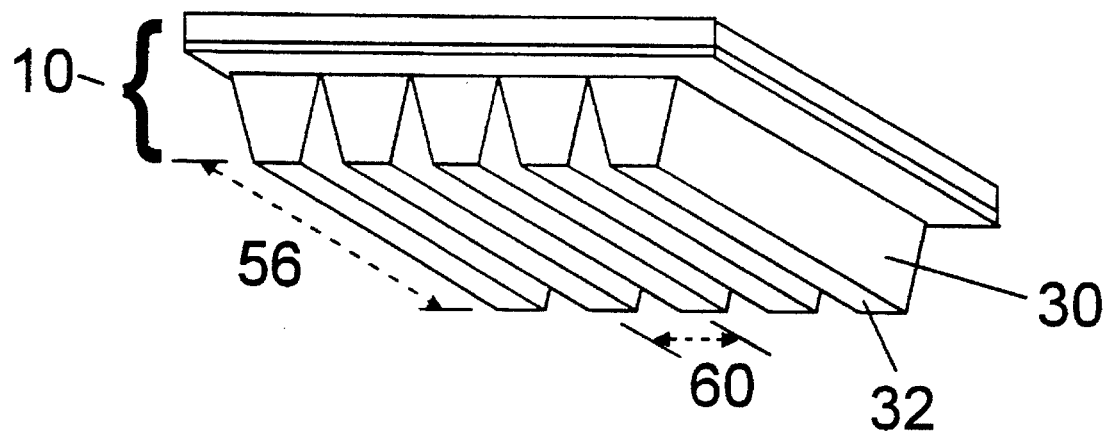

A perspective view of an array of microcollimators 30 corresponding to an array of apertures 22 is shown in FIGS. 5A, 5B and 5C. The figures illustrate possible configurations of a single microcollimator 30 and possible arrangements of an array of microcollimators 30.

The second collimating means 12 comprises an array of microlenses 40. The microlenses 40 are preferably made from the same monomers as those previously disclosed for the microcollimators 30 and have a index of refraction equal to or substantially equal to the index of refraction of the microcollimators 30. However, any transparent material may be used, as for example, those materials previously discussed.

Figure 6:
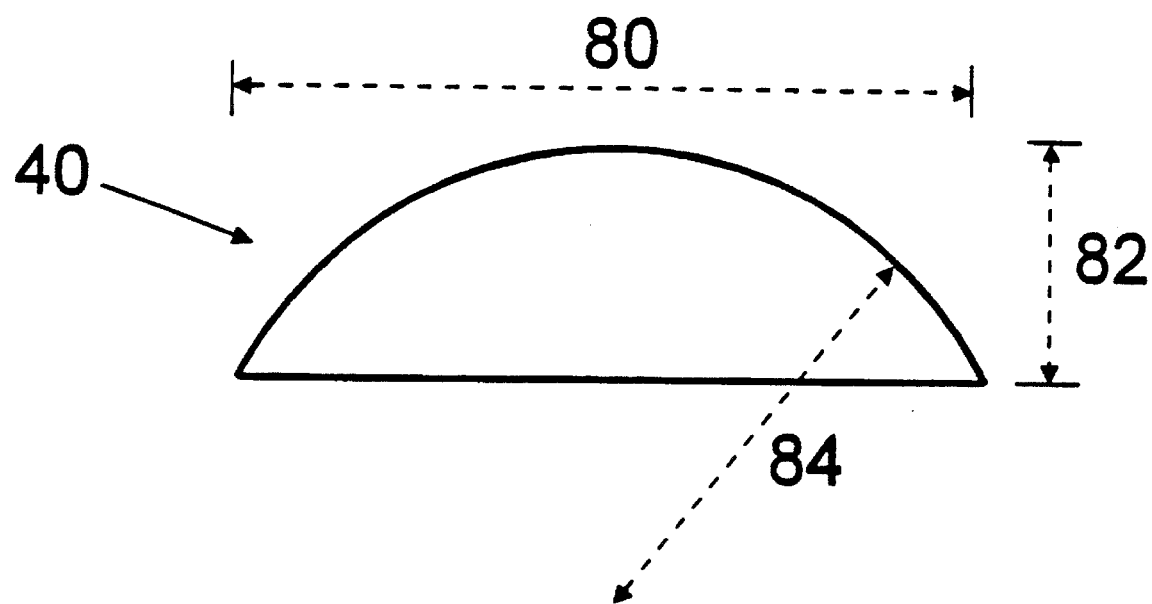
FIG. 6 is a section view of a single microlens.

A single microlens 40 is shown in FIG. 6. The microlens 40 can be either a spherical lens or an aspherical lens. The dimension 80 represents the flat light input surface of microlens 40 and can vary from about 10 microns to 40 millimeters. More preferred values of the dimension 80 range from about 50 microns to about 10 millimeters. Most preferred values of the dimension 80 can range from about 100 microns to about 2 millimeters. The desired values of height 82 range from about 0.05 times the dimension 80 to about 4.0 times the dimension 80. More preferred values for the height 82 range from about 0.08 times the dimension 80 to about 3.0 times the dimension 80. Most preferred values for the height 82 range from about 0.10 times the dimension 80 to about 2.0 times the dimension 80. If microlens 40 is a spherical lens, the lens will have one curved output light surface having a radius of curvature 84. The radius of curvature can vary widely depending on the repeat distances 46 and 48 or 52 and 54 of the corresponding microcollimator array. Preferred values for the radius of curvature range from about 5 microns to about 20 millimeters. More preferred values for the radius of curvature 84 range from about 25 microns to about 5 millimeters. Most preferred values for the radius of curvature 84 range from about 50 microns to about 1 millimeter. In order that microlens 40 collect substantially all of the light directed out of microcollimator 30, the f-number of microlens 40 should be relatively small. The f-number values for microlens 40 can range from about 0.5 to about 4.0. More preferred values for the f-number range from about 0.6 to about 3.0. Most preferred values for the f-number range from about 0.7 to about 2.0.

Figure 7A:
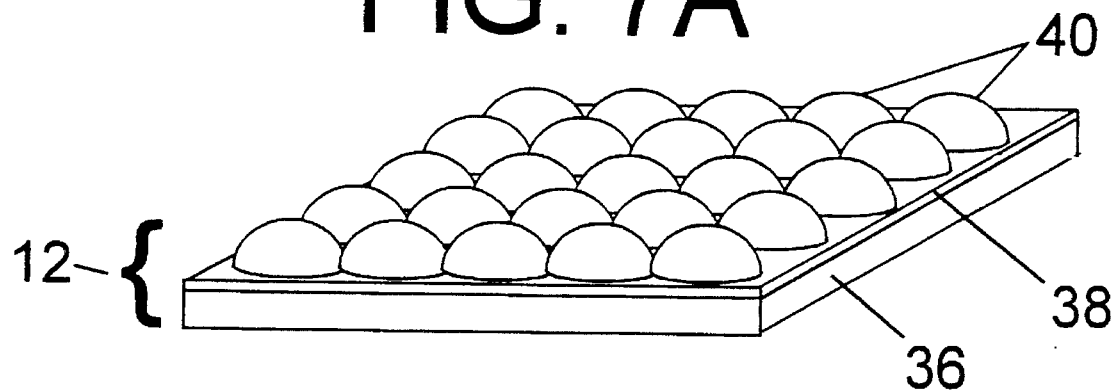
FIGS. 7A–C are perspective views of alternate arrangements of the second collimating means comprising an array of microlenses.
Figure 7B:
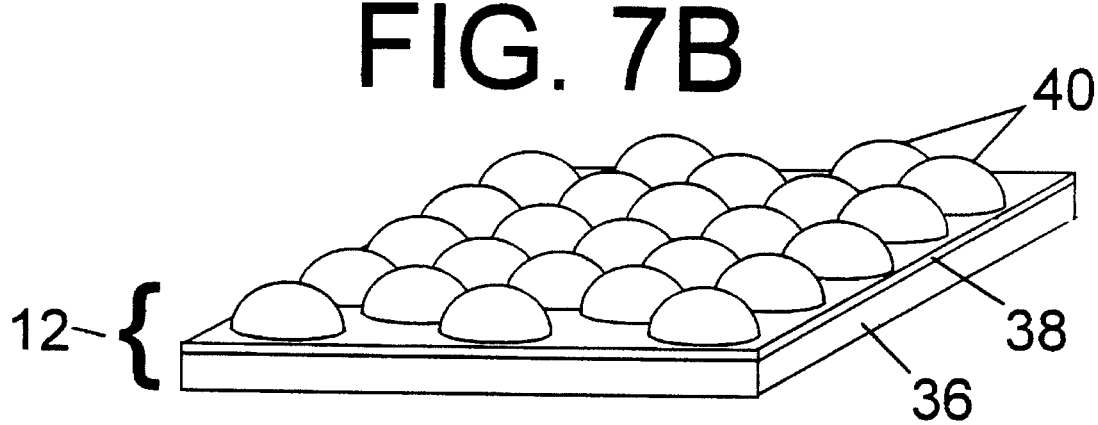
Figure 7C:
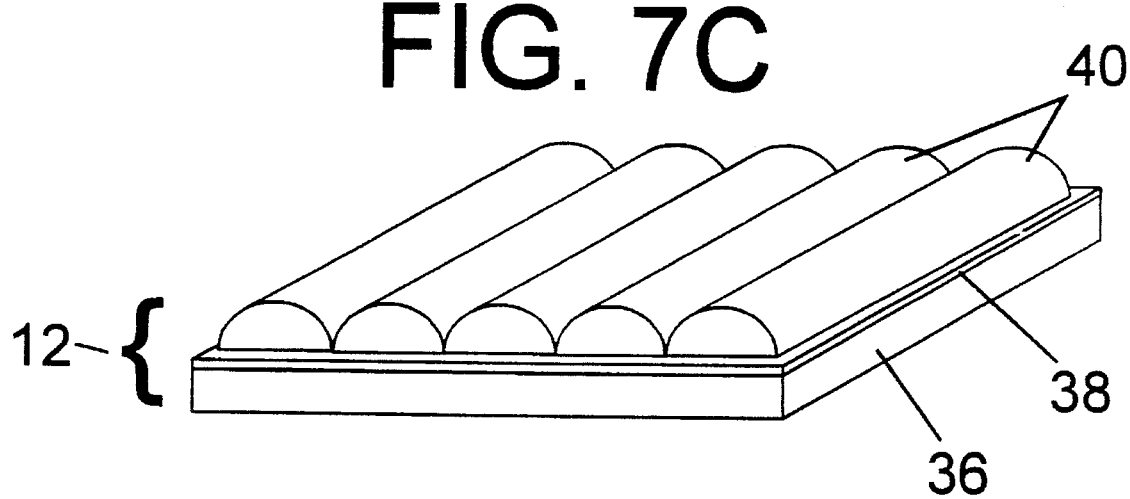

A perspective view of an array of microlenses 40 corresponding to the array of apertures 22 shown in FIGS. 3B, 3C and 3D is shown in FIGS. 7A, 7B and 7C respectively. Accordingly, the array of microlenses would have the same repeat distances as those of the array of apertures 22.

Figure 8A:
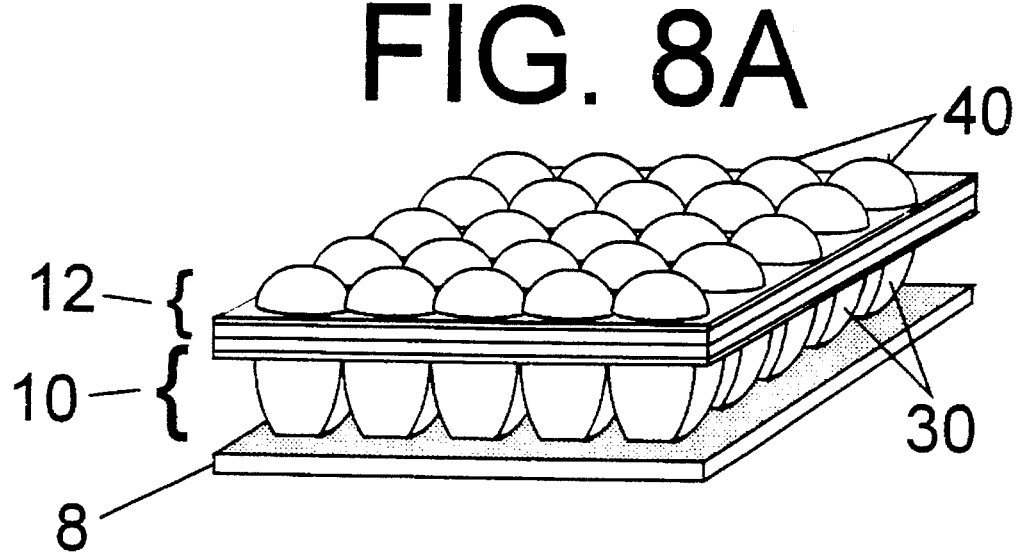
FIGS. 8A–C are perspective views of alternate arrangements of the present invention comprising an aperturing means, an array of microcollimators and an array of microlenses.
Figure 8B:
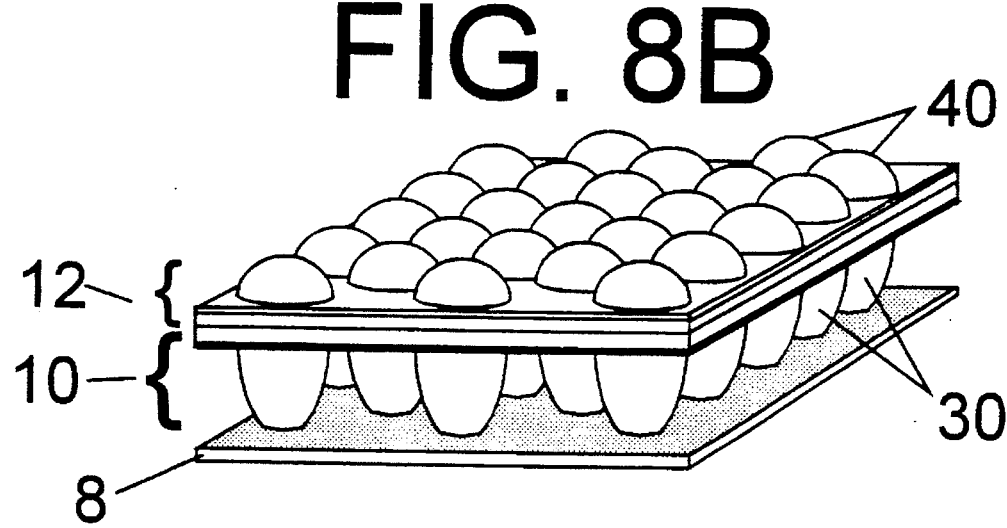
Figure 8C:
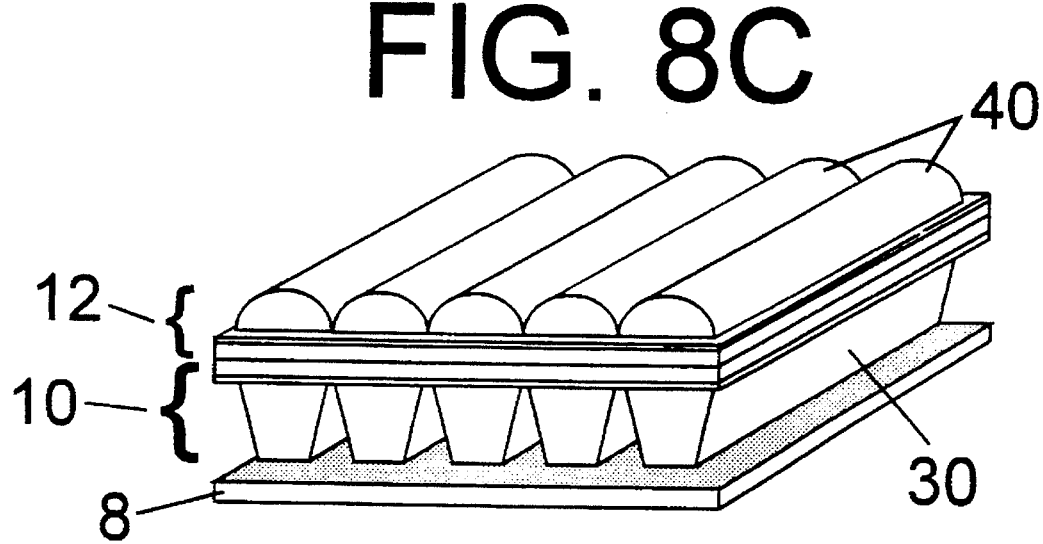

An exploded perspective view of corresponding microcollimator arrays and microlens arrays is shown in FIGS. 8A, 8B and 8C. For every aperture 22 there exists a corresponding microcollimator 30 and a corresponding microlens 40 that aligns with the output surface 34 of each microcollimator 30. In operation, the substantially collimated light rays emanating from the microcollimators 30 are further collimated by the microlenses 40 to provide a more substantially collimated light source for modulating means 16.

An alternate embodiment of the invention is shown in FIGS. 9, 10A, 10B and 10C. In this embodiment the first collimating means comprises a planar slab of transparent material 70. An array of microlenses 40 are attached to the planar slab 70. Divergent light rays transmit through substrate 21 via refraction and travel through planar slab 70 according to Snell's Law. The rays then enter microlenses 40 and transmit through the microlenses 40 via refraction and emerge from the microlenses 40 as a substantially collimated light source for the modulating means 16. Slab waveguide 70 preferably has the same characteristics of substrates 21 and 36 as earlier described. The thickness of slab waveguide 70 is optimized to cause the light rays refracted therethrough to be collimated by microlenses 40.

Figure 10A:
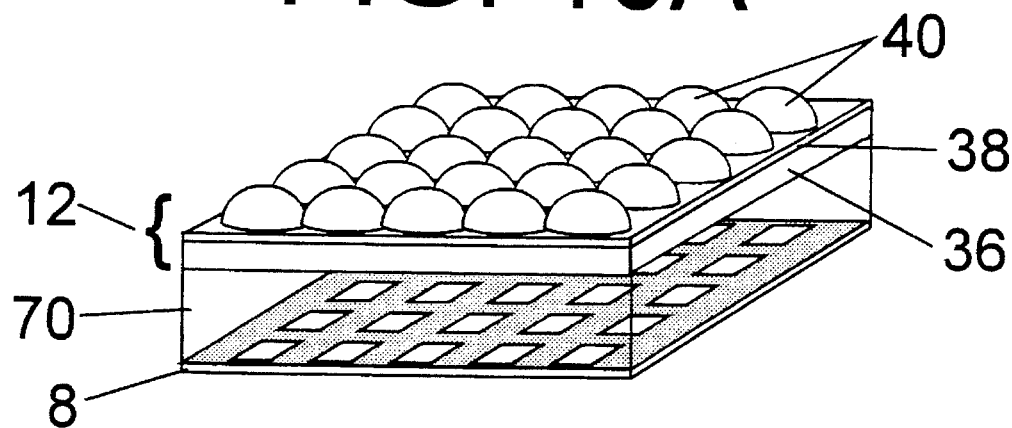
FIGS. 10A–C are perspective views of alternate arrangements of the present invention comprising a planar slab of transparent material.
Figure 10B:
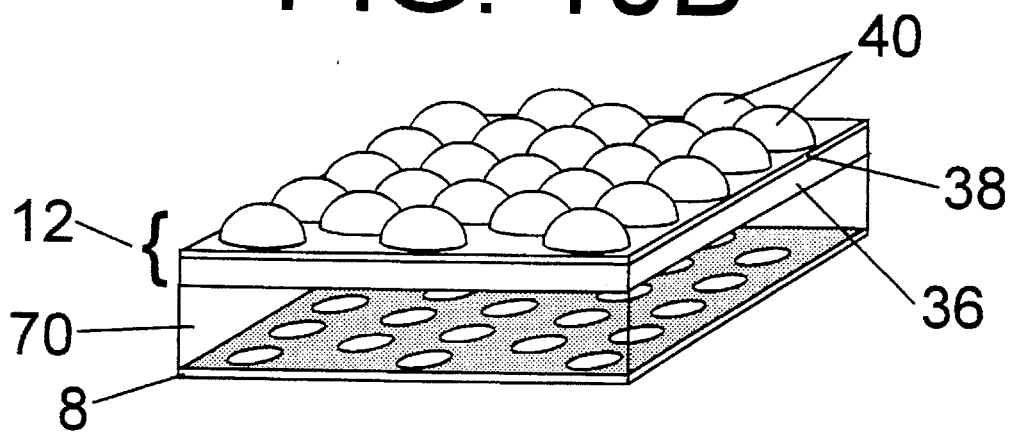
Figure 10C:
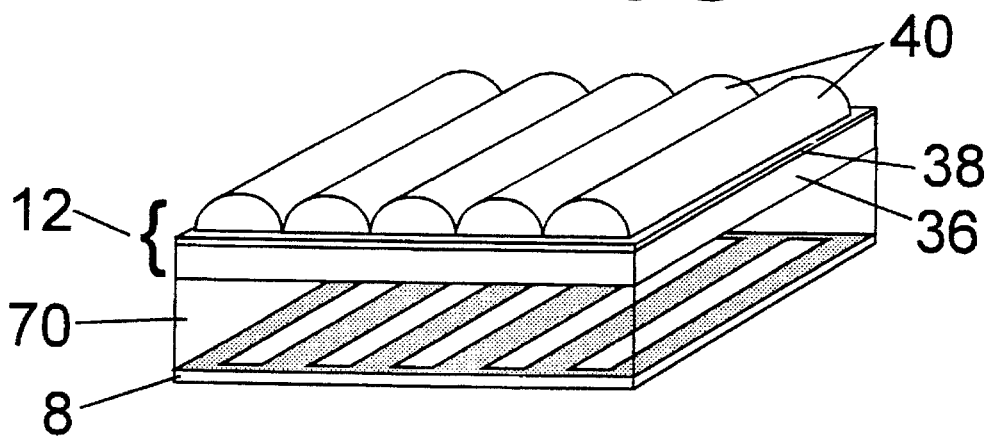

FIGS. 10A, 10B and 10C illustrate possible configurations of the array of microlenses 40 attached on the surface of slab waveguide 70. As previously discussed, a single microlens 40 correlates with a single aperture 22.

Figure 11:
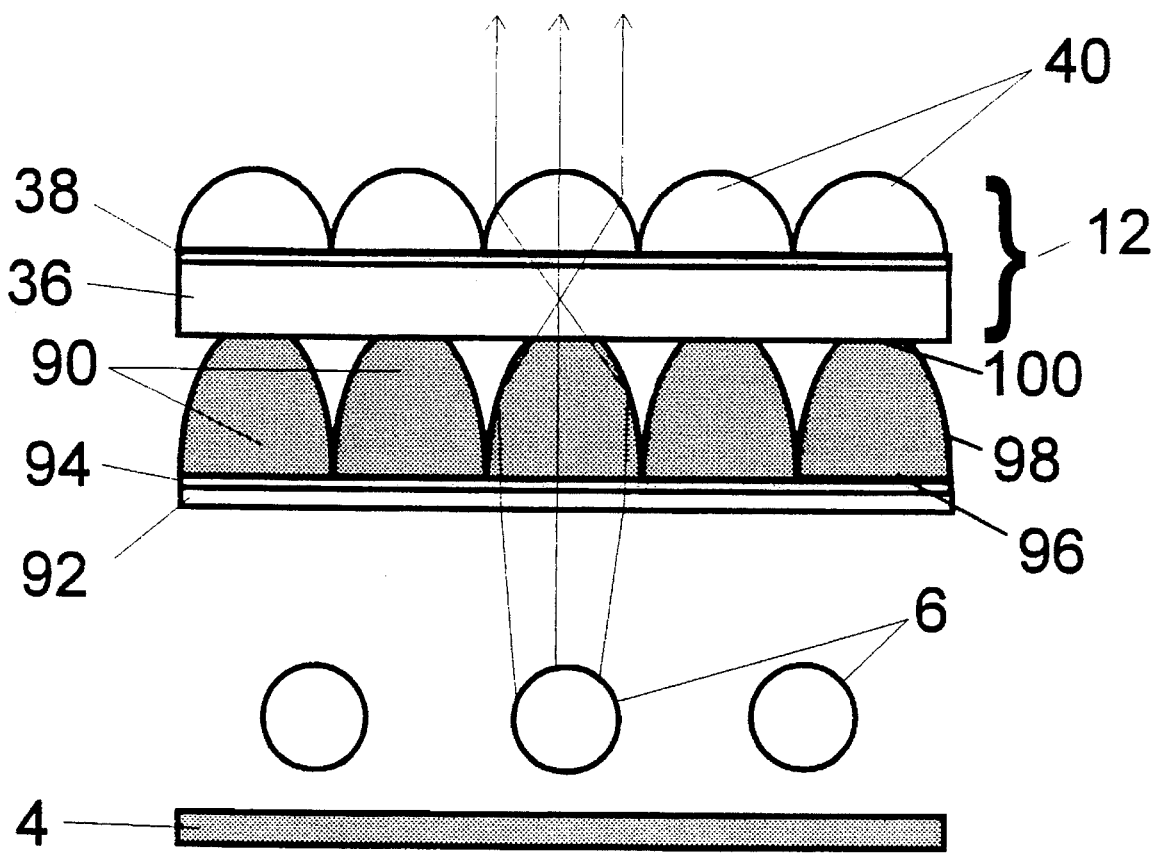
FIG. 11 is an alternate embodiment of the present invention comprising an array of microconcentrators.

A further embodiment of the present invention is shown in FIG. 11. the backlight assembly comprises a light concentrating means in combination with an array of microlenses 40. The light concentrating means is perferably an array of microconcentrators 90. Microconcentrators 90 are tapered optical elements attached to a planar substrate 92 via adhesion promoting layer 94 and having mirrored sidewalls 98, a planar light input surface 96 adjacent to the substrate, and a planar output end 100 distal from and parallel to the light input surface 96, wherein the area of the light output surface 100 is smaller than the area of the light input surface 96. Uncollimated light rays from the light source 6 pass through the array of microconcentrators 90 via one or more reflections from the mirrored sidewalls 98. The tapered construction concentrates the light rays so that the output of each microconcentrator 90 becomes a source of light that is substantially smaller in area than the area of the light input surface 96. The output of the microconcentrators 90 is directed to a corresponding array of microlenses 40 disposed above the microconcentrators 90 at the appropriate distance. The light is transmitted through each microlens 40 via refraction and emerges from the microlenses as a substantially collimated light source for the modulating means 16.

Figure 12:
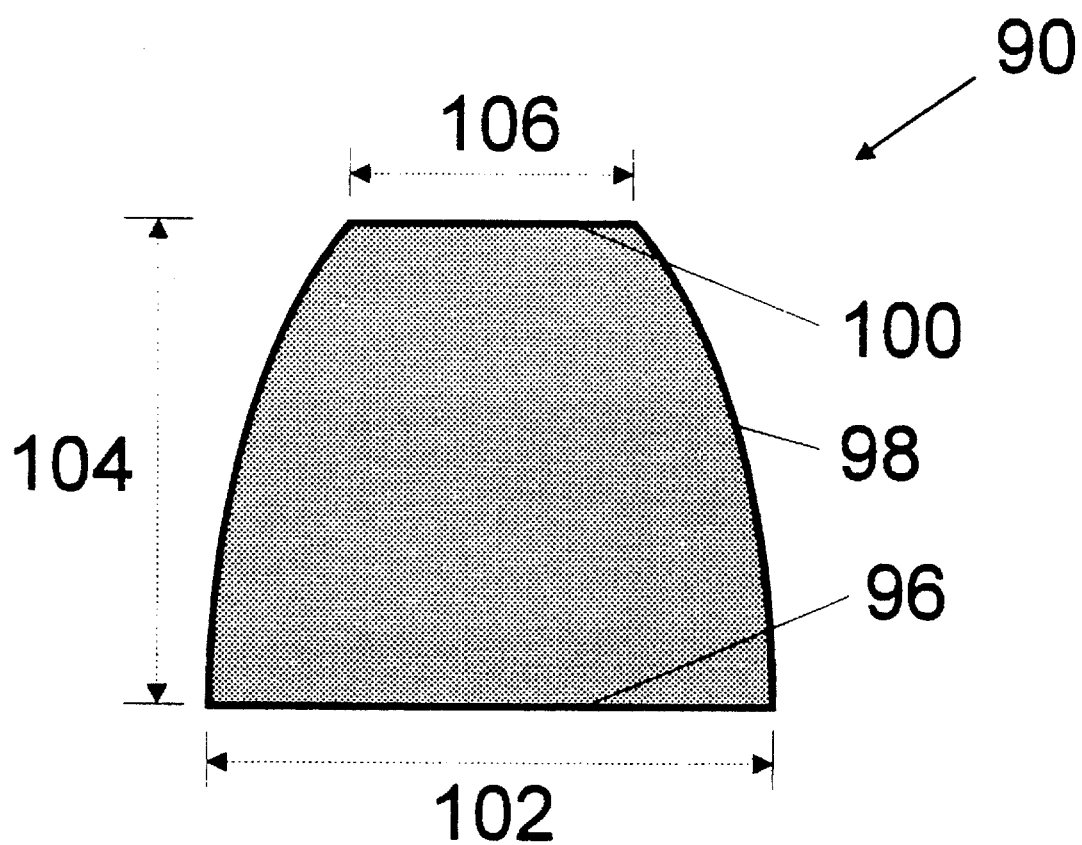
FIG. 12 is a section view of a single microconcentrator.
Figure 13A:
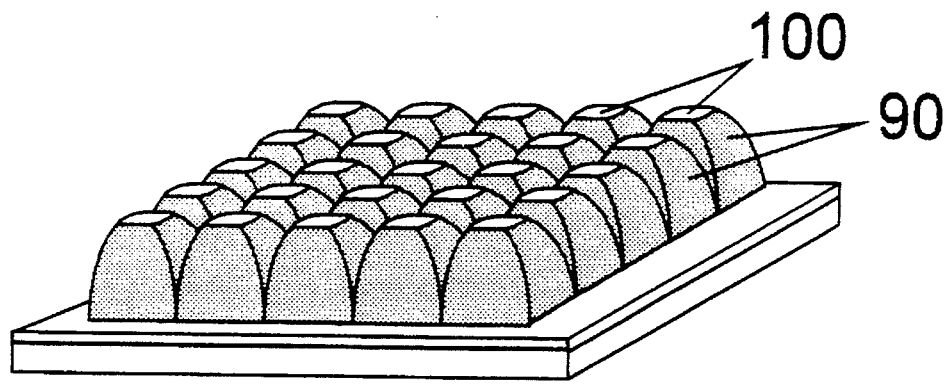
FIGS. 13A–C are perspective views of alternate arrangements of the present invention comprising an array of microconcentrators.
Figure 13B:
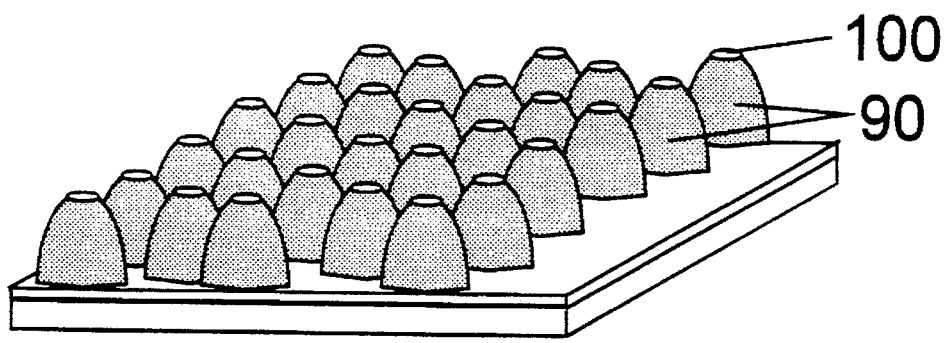
Figure 13C:
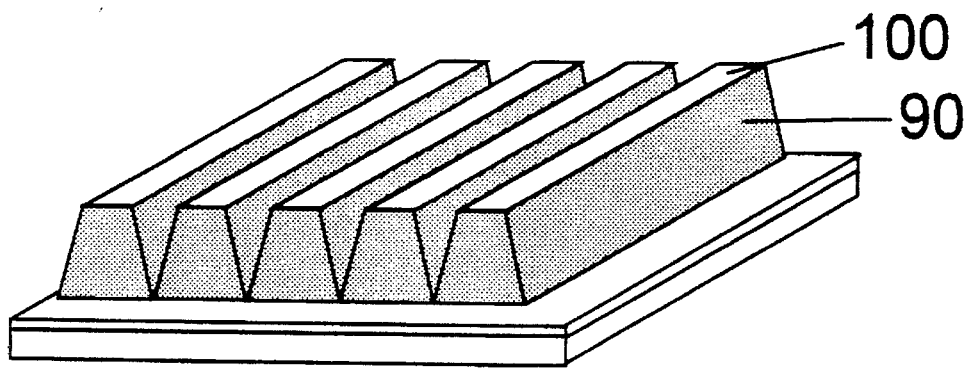
Figure 14A:
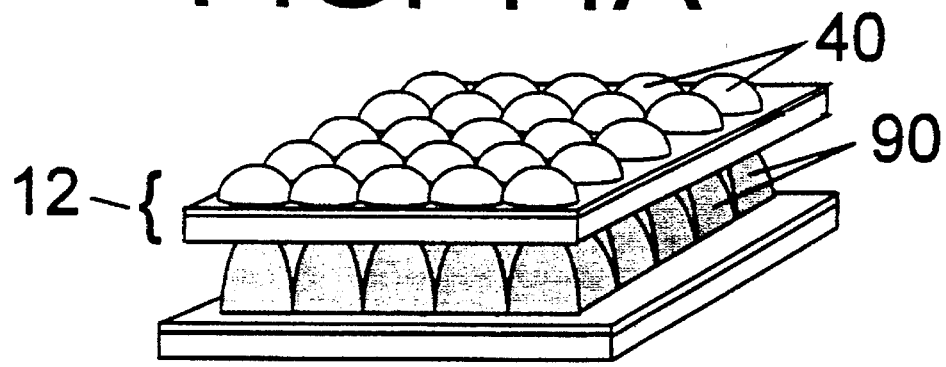
FIGS. 14A–C are perspective views of alternate arrangements of the present invention comprising an array of microconcentrators and an array of microlenses.
Figure 14B:
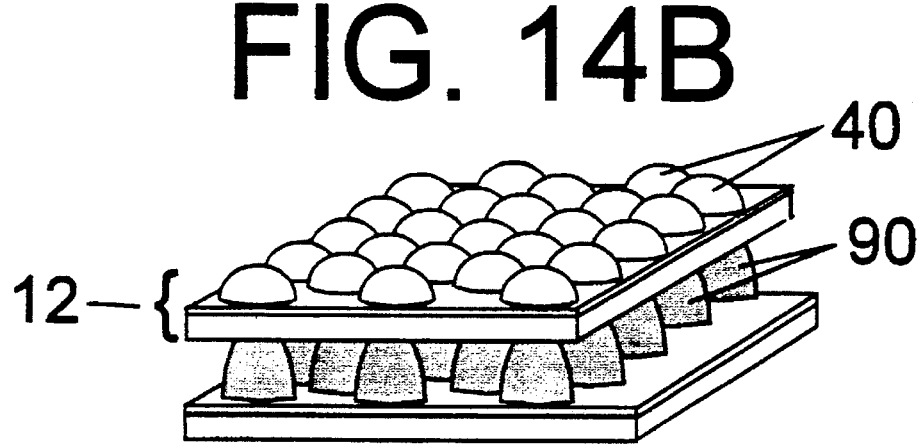
Figure 14C:
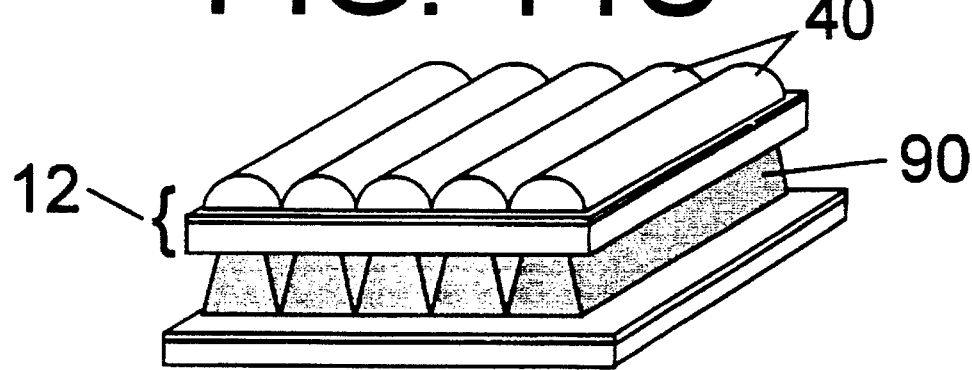

A single microconcentrator 90 is shown in FIG. 12. Its dimensions 102, 104 and 106 are the same as dimensions 72, 70 and 68, respectively, disclosed above for a microcollimator 30.

FIGS. 13A–13C and 14A–14C further illustrate the possible arrangements of an array of microconcentrators with a corresponding array of microlenses 40.

Arrays of microcollimators 30, microconcentrators 90 and microlenses 40 can be manufactured by a variety of techniques including injection molding, compression molding, hot roller pressing casting, photopolymerization within a mold and photopolymerization processes which do not employ a mold. A preferred technique is the photopolymerization process as disclosed and illustrated in the aforementioned U.S. patent application incorporated by reference. Some simple modifications to that process are shown in FIGS. 15A and 15B.

Figure 15A:
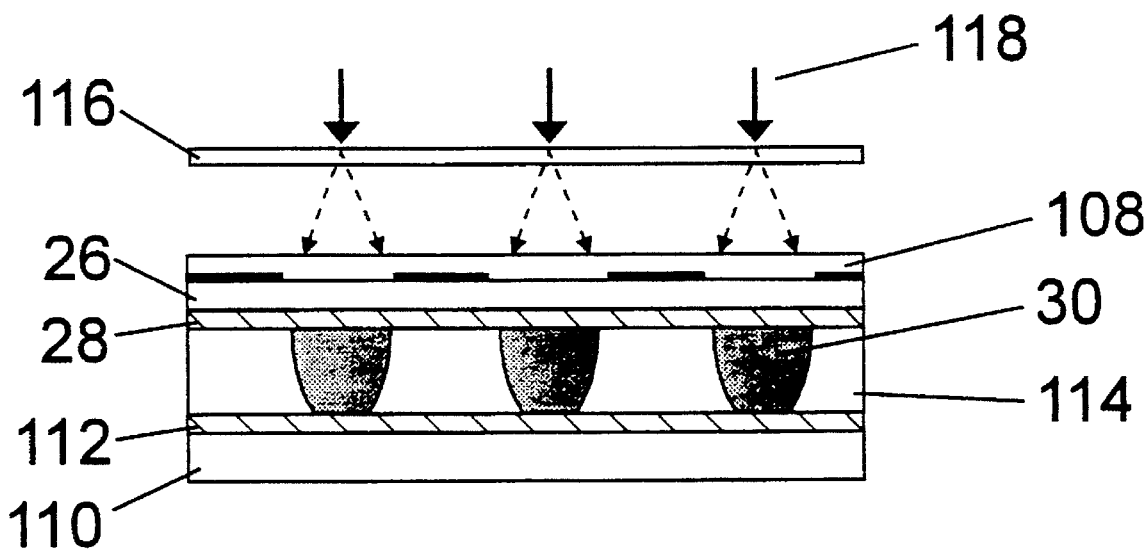
FIGS. 15A–B illustrate methods of fabricating microcollimators, microconcentrators and microlenses.

FIG. 15A illustrates a photopolymerization process to produce microcollimators 30 of the type shown in FIGS. 1, 2, 4 and 5 and microconcentrators 90 of FIGS. 11–14. A photomask 108 is placed in substantial contact with a substrate 26 having an adhesion layer 28 wherein the photomask has opaque and transparent regions. A substantially uniform thickness of photopolymerizable mixture 114 comprising monomer and a photoinitiator is placed between substrate 26 with adhesion layer 28 and backing plate 110 with release layer 112. In order to form microcollimators or microconcentrators, the photoinitiator must be present in a sufficient amount to absorb a significant fraction of the ultraviolet light within the photopolymerizable mixture layer. A light diffuser 116 is placed between the photomask 108 and the source of ultraviolet light 118 which causes the ultraviolet light to be spread over a range of angles. In order that the type of microcollimators 30 and microconcentrators 90 be formed, the diffuser should spread the light over a full angle (measured at the 50% intensity points) of approximately 15–45 degrees. The photopolymerizable mixture 114 is exposed to ultraviolet light 118 through diffuser 116 and through the transparent regions of the photomask 108 for a time and under conditions sufficient to photopolymerize regions of the monomer mixture to form an array of microcollimators or microconcentrators. After exposure to ultraviolet light, photomask 108, backing plate 110 with release layer 112 and the unexposed photopolymerizable mixture 114 are removed leaving an array of microconcentrators or microcollimators attached by adhesion layer 28 to substrate 26.

Figure 15B:
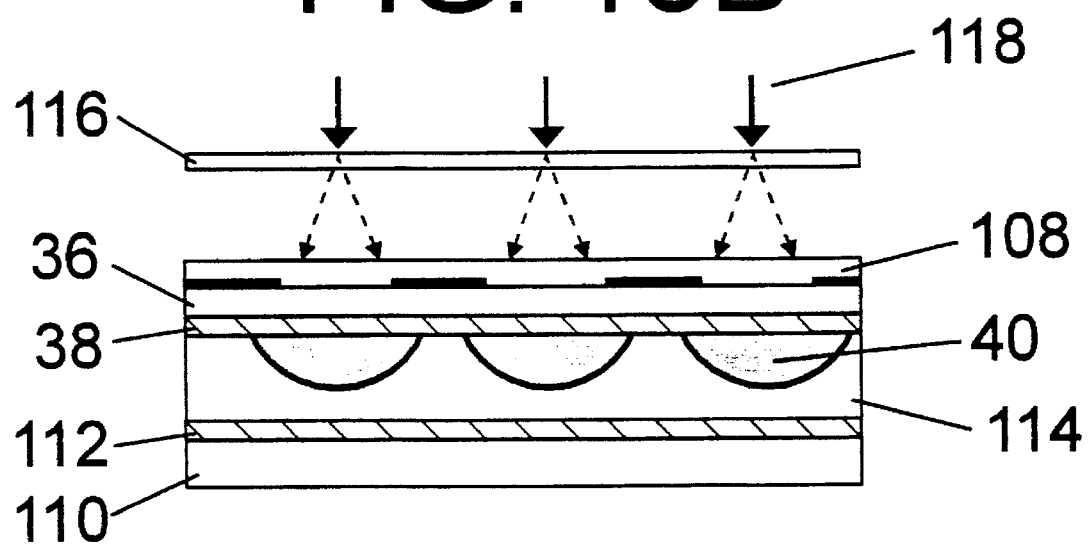

FIG. 15B illustrates a process for making microlenses 40 of the type illustrated throughout. This process is similar to the process illustrated in FIG. 15A. In order to form microlenses, the photoinitiator must be present in a sufficient amount to absorb a significant fraction of the ultraviolet light within the photopolymerizable mixture layer. A light diffuser 116 is placed between the photomask 108 and the source of ultraviolet light 118 which causes the ultraviolet light to be spread over a range of angles. In order that the type of microlenses 40 as shown be formed, the diffuser should spread the light over a full angle (measured at the 50% intensity points) of approximately 45–120 degrees. The photopolymerizable mixture 114 is exposed to ultraviolet light 118 through diffuser 116 and through the transparent regions of the photomask 108 for a time and under conditions sufficient to photopolymerize regions of the monomer mixture to form an array of microlenses 40. The ultraviolet light is turned off before the photopolymerized region touches the release layer 112. By controlling the angular spread of light passing through diffuser 116 and by controlling the thickness of the substrate layer 36, either spherical microlenses or aspherical microlenses can be formed.

This invention can be used for those applications for which backlighting is required. Illustrative of such applications are computer terminals, televisions, aircraft cockpit displays, automotive instrument panels and other devices that provide text, graphics or video information.

The following specific examples are presented to particularly illustrate the invention and should not be construed to place limitations thereon.

EXAMPLE I

An array of tapered optical elements with center-to-center spacings of 0.050" was formed on 0.004" thick polyester film using the photoexposure setup illustrated in FIG. 15A. The photolithographically created glass mask (5"×5") with 0.025"×0.025" square clear regions arranged in a square pattern and separated by 0.025" black lines that were opaque to ultraviolet and visible radiation was used. The center-to-center distance between adjacent open squares on the photomask was 0.050". Onto this mask a few drops of methanol were applied and then a 0.0065" thick poly(ethylene terephthalate) (PET) film spacer film was pressed on. Onto the spacer film a few more drops of methanol were applied and then a 0.004" thick PET substrate film was pressed on. This substrate film was prepared with an ultra-thin film surface treatment which rendered it reactive and adherable to polymerizing monomer solutions. Such surface-activated films were known to those skilled in the art. The surface tension of the methanol caused the two films to mildly, but firmly adhere to the mask. The mask, spacer film and the surface-activated PET substrate film constituted the array substrate subassembly.

Onto a separate 5"×5"×0.125" blank glass plate a few drops of methanol were applied and then a 0.004" thick PET film was pressed on and held in position by surface tension. This constituted the release film subassembly. The release film subassembly was placed film-side up on a black, metal platform containing threaded holes. Glass spacers 0.050" thick were placed around the edges of the release film subassembly. Approximately ten milliliters of a liquid photopolymerizable mixture were pipetted onto the center of the release film. The photopolymerizable mixture consisted of approximately 63% ethoxylated bisphenol A diacrylate, 31% trimethylolpropane triacrylate; 2% α,α-dimethyloxy-α-hydroxy acetophenone (Darocur 1173) photoinitiator, 2% benzidimethyl ketal (Irgacure 651) photoinitiator and 2% of a mixture of 1 part 1-hydroxycyclohexyl phenyl ketone and 1 part benzophenone (Irgacure 500) photoinitiator. The total percentage of photoinitiators was 6%. The array substrate assembly (photomask/spacer/substrate) was placed, PET substrate side down, on top of the photopolymerizable mixture. A clear 5"×5"×0.25" thick glass plate was placed on top of this entire fabrication assembly and metal clamps and screws were used to fully and evenly compress the plates together resulting in a 0.050" thick photopolymerizable layer between the backing plate and the substrate polyester film.

In order to form the array of tapered optical elements, the entire fabrication assembly was placed under the collimating lens of an ultraviolet (UV) radiation exposure system. A light diffusing sheet of translucent plastic film was placed between the photomask and the collimated lens of the UV radiation exposure system which caused the ultraviolet light to be spread over a range of angles. In order to form tapered optical elements, the diffuser was chosen so that the light spread over a full angle (measured at the 50% intensity points) of approximately 20 degrees. The fabrication assembly was irradiated with UV light for 80 seconds. The fabrication assembly was then dissassembled and the film with the array of tapered optical elements now formed, but still covered with unreacted photopolymerizable material in the interstitial regions between the tapered optical elements, was placed in a stirred bath of isopropanol and left for ten minutes. After removal of the residual monomer, the tapered optical elements were dried in a stream of nitrogen gas, placed in a nitrogen gas-purged enclosure with a quartz window, and hard cured under the UV radiation for an additional 20 seconds.

Optical microscopy was used to evaluate the tapered optical elements. The cross-sectional shape of the individual tapered optical elements was approximately square with dimensions of approximately 0.040"×0.040" for the ends of the tapered optical elements adjacent to the substrate (output ends). The ends of the tapered optical elements distal to the substrate (input ends) had dimensions of approximately 0.020"×0.020". The height of the tapered optical elements was approximately 0.050".

EXAMPLE II

In order to deposit a reflective aluminum coating on the sidewalls of the array of tapered optical elements of Example I, the array was placed, substrate side down, into a vacuum evaporator. Approximately 1 micron of aluminum was evaporated onto the tapered optical elements. The evaporated aluminum coated the sides of the tapered optical elements and the ends of the tapered optical elements distal to the substrate. The aluminum-coated array was removed from the evaporator. The aluminum coating on the ends of the tapered optical elements distal to the substrate was removed by polishing the ends of the optical elements first with polishing paper coated with 15 micron grit followed by polishing with paper coated with 3 micron and then 0.3 micron grit. The resulting array of tapered optical elements with aluminum coated sidewalls can be used as either an array of microcollimators by using the 0.020"×0.020" ends of the optical elements as the light input ends and the 0.040"×0.040" ends of the optical elements as the light output ends or as an array of microconcentrators by using the 0.040"×0.040" ends of the optical elements as the light input ends and the 0.020"×0.020" ends of the optical elements as the light output ends.

EXAMPLE III

An array of microlenses with center-to-center spacings of 0.050" was formed on 0.004" thick polyester film using the photoexposure setup illustrated in FIG. 15B. The photolithographically created glass mask (5"×5") with 0.025"×0.025" square clear regions arranged in a square pattern and separated by 0.025" black lines that were opaque to ultraviolet and visible radiation was used. The center-to-center distance between adjacent open squares on the photomask was 0.050". Onto this mask a few drops of methanol were applied and then a 0.013" thick poly(ethylene terephthalate) (PET) film spacer film was pressed on. Onto the spacer film a few more drops of methanol were applied and then a 0.004" thick PET substrate film was pressed on. This substrate film was prepared with an ultra-thin film surface treatment which rendered it reactive and adherable to polymerizing monomer solutions. Such surface-activated films were known to those skilled in the art. The surface tension of the methanol caused the two films to mildly, but firmly adhere to the mask. The mask, spacer film and the surface-activated PET substrate film constituted the array substrate subassembly.

Onto a separate 5"×5"×0.125" blank glass plate a few drops of methanol were applied and then a 0.004" thick PET film was pressed on and held in position by surface tension.

This constituted the release film subassembly. The release film subassembly was placed film-side up on a black, metal platform containing threaded holes. Glass spacers 0.050" thick were placed around the edges of the release film subassembly. Approximately ten milliliters of a liquid photopolymerizable mixture were pipetted onto the center of the release film. The photopolymerizable mixture consisted of approximately 63% ethoxylated bisphenol A diacrylate, 31% trimethylolpropane triacrylate; 2% α,α-dimethyloxy-α-hydroxy acetophenone (Darocur 1173) photoinitiator, 2% benzidimethyl ketal (Irgacure 651) photoinitiator and 2% of a mixture of 1 part 1-hydroxycyclohexyl phenyl ketone and 1 part benzophenone (Irgacure 500) photoinitiator. The total percentage of photoinitiators was 6%. The array substrate assembly (photomask/spacer/substrate) was placed, PET substrate side down, on top of the photopolymerizable mixture. A clear 5"×5"×0.25" thick glass plate was placed on top of this entire fabrication assembly and metal clamps and screws were used to fully and evenly compress the plates together resulting in a 0.050" thick photopolymerizable layer between the backing plate and the substrate polyester film.

In order to form the microlens array, the entire fabrication assembly was placed under the collimating lens of an ultraviolet (UV) radiation exposure system. A light diffusing sheet of translucent plastic film was placed between the photomask and the collimated lens of the UV radiation exposure system which caused the ultraviolet light to be spread over a range of angles. In order to form microlenses, the diffuser was chosen so that the light spread over a full angle (measured at the 50% intensity points) of approximately 90 degrees. The fabrication assembly was irradiated with UV light for 30 seconds. The area of photopolymerization did not come in contact with the release film. The fabrication assembly was then dissassembled and the film with the array of microlenses now formed, but still covered with unreacted photopolymerizable material in the interstitial regions between the microlenses, was placed in a stirred bath of isopropanol and left for ten minutes. After removal of the residual monomer, the microlenses were dried in a stream of nitrogen gas, placed in a nitrogen gas-purged enclosure with a quartz window, and hard cured under the UV radiation for an additional 20 seconds.

Optical microscopy was used to evaluate the microlenses. The lenses were approximately round with a diameter of 0.050". The height of the lenses was approximately 0.025".

EXAMPLE IV

A collimating light assembly was constructed in the arrangement of FIG. 2B using the array of aluminum coated microcollimators of Example II and the array of microlenses of Example III. A serpentine fluorescent lamp with an input power of approximately 30 Watts was used as the light source. The surface luminance of the fluorescent lamp itself was measured to be 3000 foot-lamberts. The array of aluminized microcollimators was placed a distance of approximately 0.25" from the plane of the serpentine fluorescent lamp. The small polished ends of the microcollimators were facing the lamp. The array of microlenses was placed adjacent to the array of microcollimators and aligned so that flat input surface of each microlens was aligned with an output surface of the microcollimator. Spacer films of PET were placed between the output side of the micorcollimator array and the input side of the microlens array to adjust the spacing between the microlenses and microcollimators. The best results occured when the total spacing between the microcollimators and the microlenses was approximately 0.050". The output light from the collimating light assembly had an angular spread of approximately ±20° measured from a direction perpendicular to the plane of the assembly. At the center of the output light distribution, the luminance of the collimating light assembly was approximately 3000 foot-lamberts.

EXAMPLE V

Figure 9:
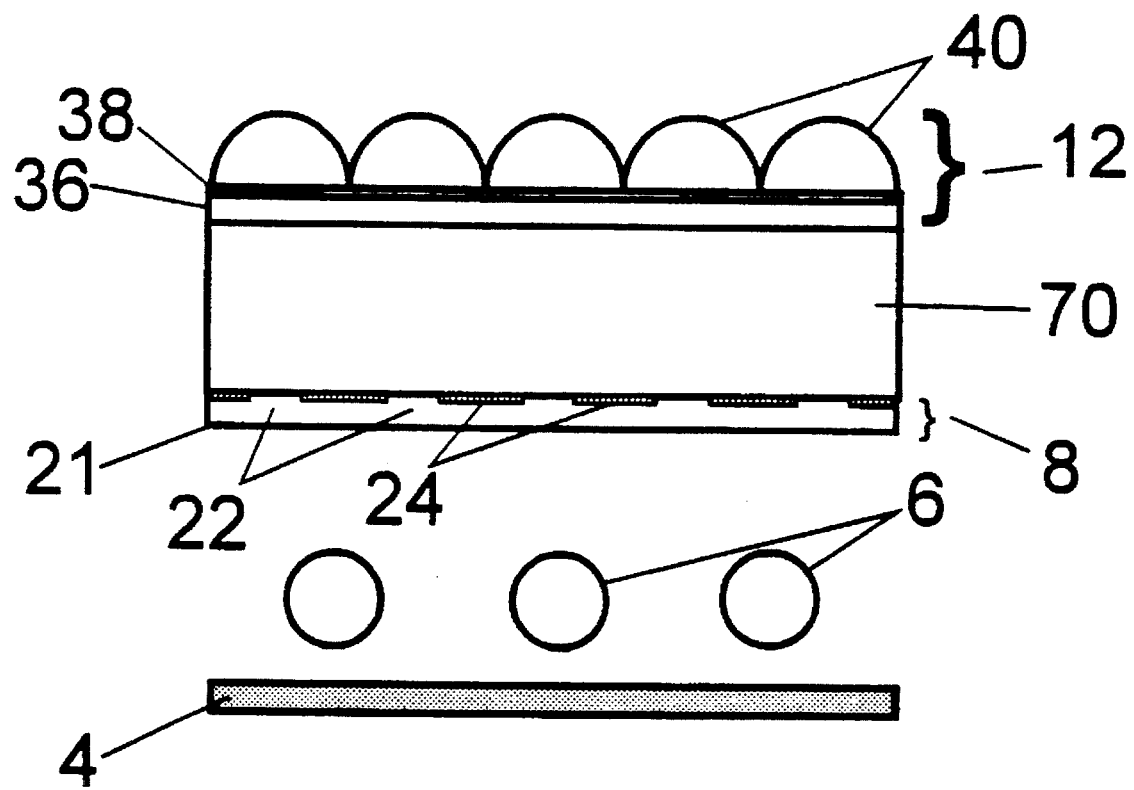
FIG. 9 is an alternate embodiment of the present invention comprising a planar slab of transparent material.

A collimating light assembly was constructed in the arrangement of FIG. 9 using an aluminum coated mask as an array of apertures and the array of microlenses of Example III. The aluminum coated mask had 0.025"×0.025" square clear regions arranged in a square pattern and separated by 0.025" black lines that were opaque to visible radiation. The center-to-center distance between adjacent open squares on the photomask was 0.050". A serpentine fluorescent lamp with an input power of approximately 30 Watts was used as the light source. The surface luminance of the fluorescent lamp itself was measured to be 3000 foot-lamberts. The aluminum coated mask was placed a distance of approximately 0.25" from the plane of the serpentine fluorescent lamp. The array of microlenses was placed adjacent to the mask and aligned so that flat input surface of each microlens was aligned with an open square aperture in the mask. Spacer films of PET were placed between the mask and the input side of the microlens array to adjust the spacing between the microlenses and the mask. The best results occured when the total spacing between the microlenses and the mask was approximately 0.050". The output light from the collimating light assembly had an angular spread of approximately ±20° measured from a direction perpendicular to the plane of the assembly. At the center of the output light distribution, the luminance of the collimating light assembly was approximately 3000 foot-lamberts.

EXAMPLE VI

A collimating light assembly was constructed in the arrangement of FIG. 11 using the array of aluminum coated microconcentrators of Example II and the array of microlenses of Example III. A serpentine fluorescent lamp with an input power of approximately 30 Watts was used as the light source. The surface luminance of the fluorescent lamp itself was measured to be 3000 foot-lamberts. The array of aluminized microcollimators was placed a distance of approximately 0.25" from the plane of the serpentine fluorescent lamp. The array of microconcentrators was oriented so that the large ends of the microconcentrators were facing the lamp. The array of microlenses was placed adjacent to the array of microconcentrators and aligned so that flat input surface of each microlens was aligned with an output surface of the microconcentrator. Spacer films of PET were placed between the output side of the microconcentrator array and the input side of the microlens array to adjust the spacing between the microlenses and microconcentrators. The best results occured when the total spacing between the microconcentrators and the microlenses was approximately 0.050". The output light from the collimating light assembly had an angular spread of approximately ±20° measured from a direction perpendicular to the plane of the assembly. At the center of the output light distribution, the luminance of the collimating light assembly was approximately 3000 foot-lamberts.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A backlight assembly for use in an electo-optical display, said display having a modulating means capable of providing an image to a remotely positioned observer, and said backlight assembly comprising:
   (a) a light generating means;
   (b) an aperturing means operatively disposed in close proximity between said light generating means and said modulating means;
   (c) a first collimating means disposed between said aperturing means and said modulating means, said first collimating means having a planar light input surface in close proximity to said aperture means and a planar light output surface distal from and parallel to said light input surface and larger in surface area than said light input surface, wherein said light rays transmit through said first collimating means via total internal reflection and exit from said light output surface in a substantially collimated pattern; and
   (d) a second collimating means disposed between said first collimating means and said modulating means and having a light input surface that accepts said substantially collimated light rays from said first collimating means and transmits the light rays via refraction and directs said light rays towards said modulating means in a substantially more collimated pattern.

2. The backlight assembly of claim 1 wherein said first collimating means comprises an array of tapered optical elements.

3. The backlight assembly of claim 2 wherein at least one of said optical elements has a circular cross-sectional area.

4. The backlight assembly of claim 2 wherein at least one of said optical elements has a polygonal cross-sectional area.

5. The backlight assembly of claim 1 wherein said second collimating means comprises an array of microlenses.

6. The backlight assembly of claim 1 wherein said aperturing means and said first collimating means comprise an array of tapered optical elements having reflective sides.

7. A backlight assembly for use in an electro-optical display comprising
   (a) a light generating means;
   (b) a concentrating means having a planar light input surface in close proximity to said light generating means, a planar light output surface distal from and parallel to said light input surface and smaller in surface area than said light input surface and mirrored sidewalls wherein said light rays enter through said light input surface and travel through said concentrating means via reflection and emerge from said light output surface as a more concentrated light source; and
   (c) a collimating means disposed in close proximity to said output surface and having a light input surface that accepts said concentrated light source from said concentrating means and transmits the light rays via refraction that emerge as a substantially collimated light source.

8. The backlight assembly of claim 7 wherein said concentrating means is an array of tapered optical elements.

9. The backlight assembly of claim 8 wherein at least one of said optical elements has a circular cross-sectional area.

10. The backlight assembly of claim 8 wherein at least one of said optical elements has a polygonal cross-sectional area.

11. The backlight assembly of claim 7 wherein said collimating means comprises an array of microlenses.

12. A backlight assembly for providing a substantially collimating light source comprising:
   (a) a light generating means;
   (b) an aperturing means operatively disposed in close proximity between said light generating means and said modulating means;
   (c) an array of microcollimators disposed between said aperturing means, wherein each microcollimator comprises a planar light input surface in close proximity to said aperture means and a planar light output surface distal from and parallel to said light input surface and larger in surface area than said light input surface, wherein said light rays first transmit through said aperturing means and then through said array of microcollimators via total internal reflection and exit from said light output surface in a substantially collimated pattern; and
   (d) an array of microlenses operatively disposed in close proximity to said array of microcollimators and comprising a light input surface that accepts said substantially collimated light rays from said array of microcollimators, wherein said light rays transmit through said array of microlenses via refraction and emerge as a substantially more collimated light source.

13. The backlight assembly of claim 12 wherein said microcollimators and said microlenses are constructed from organic polymeric material.

14. The backlight assembly of claim 12 wherein said microcollimators and said microlenses have an index of refraction of between about 1.45 and about 1.65.

15. A direct-view flat panel display comprising:
   (a) a modulating means for modulating light to form an image visible to a remote observer;
   (b) an image display means for displaying said image from said modulating means positioned adjacent to the light output surface of said modulating means, said display means comprising an array of tapered optical waveguides on a planar substrate, the tapered end of each of said waveguides extending outward from said substrate and having a light input surface adjacent said substrate and a light output surface distal from said light input surface;
   (c) a backlight assembly comprising:
      (i) a light generating means;
      (ii) an aperturing means operatively disposed in close proximity between said light generating means and said modulating means;
      (iii) an array of microcollimators disposed between said aperturing means and said modulating means, wherein each microcollimator comprises a light input surface in close proximity to said aperture means and a light output surface larger in surface area than said corresponding light input surface, wherein light rays first transmit through said aperturing means and then through said array of microcollimators via total internal reflection and exit from said microcollimator light output surface in a substantially collimated pattern; and
      (iv) an array of microlenses operatively disposed in close proximity between said array of microconcentrators and said modulating means and comprising a light input surface that accepts said substantially collimated light rays from said array of microcollimators, wherein said light rays transmit through said array of microlenses via refraction and emerge as a substantially more collimated light source for said modulating means.

16. A backlight assembly for use in an electo-optical display, said display having a modulating means capable of providing an image to a remotely positioned observer, and said backlight assembly comprising:

(a) a light generating means;

(b) an aperturing means operatively disposed in close proximity between said light generating means and said modulating means;

(c) a first collimating means disposed between said aperturing means and said modulating means, said first collimating means having a light input surface in close proximity to said aperture means and a light output surface larger in surface area than said light input surface, wherein said light rays transmit through said first collimating means via total internal reflection and exit from said light output surface in a substantially collimated pattern; and (d) a second collimating means disposed between said first collimating means and said modulating means and having a light input surface that accepts said substantially collimated light rays from said first collimating means and transmits the light rays via refraction and directs said light rays towards said modulating means in a substantially more collimated pattern.

17. A backlight assembly for use in an electo-optical display, said display having a modulating means capable of providing an image to a remotely positioned observer, and said backlight assembly comprising:

(a) a light generating means;

(b) an aperturing means operatively disposed in close proximity between said light generating means and said modulating means;

(c) a first collimating means comprising a planar slab of transparent material disposed between said aperturing means and said modulating means, wherein said light rays transmit through said first collimating means via total internal reflection and exit from said light output surface in a substantially collimated pattern; and (d) a second collimating means disposed between said first collimating means and said modulating means and having a light input surface that accepts said substantially collimated light rays from said first collimating means and transmits the light rays via refraction and directs said light rays towards said modulating means in a substantially more collimated pattern.

\* \* \* \* \*